United States Patent [19]

Glover et al.

[11] Patent Number: 5,197,766
[45] Date of Patent: Mar. 30, 1993

[54] FLUID-CARRYING TUBE COUPLING ASSEMBLY WITH INTERNAL SEAL AND DRAIN ARRANGEMENT

[75] Inventors: Jeffrey Glover, Cincinnati; Scott A. Jones, Middletown, both of Ohio

[73] Assignee: General Electric Company, Cincinnati, Ohio

[21] Appl. No.: 783,601

[22] Filed: Oct. 28, 1991

[51] Int. Cl.⁵ .............................................. F16L 55/00
[52] U.S. Cl. ...................................... 285/14; 285/351; 285/363; 285/368; 210/165
[58] Field of Search ................... 285/13, 14, 351, 363, 285/368, 349, 336, 405, 412; 210/165

[56] References Cited

U.S. PATENT DOCUMENTS

| | | | |
|---|---|---|---|
| 319,365 | 6/1885 | Westinghouse, Jr. | 285/13 |
| 1,638,571 | 8/1927 | Gates | 285/14 X |
| 2,453,391 | 11/1948 | Whittingham | 285/14 |
| 2,605,045 | 7/1952 | Strezynski | 285/13 X |
| 3,001,801 | 9/1961 | Downing | 285/13 |
| 3,144,035 | 8/1964 | Hablanian et al. | 285/13 X |
| 3,158,380 | 11/1964 | Carrell et al. | 285/363 X |
| 3,248,130 | 4/1966 | Knight | 285/351 X |
| 3,264,006 | 8/1966 | Downs | 285/13 X |
| 3,485,516 | 12/1969 | Keller et al. | 285/14 |
| 3,507,506 | 4/1970 | Tillman | 285/351 X |
| 3,948,315 | 4/1976 | Powell | 285/14 X |
| 3,967,842 | 7/1976 | Kendrick | 285/14 X |
| 4,139,220 | 2/1979 | Faccou et al. | 285/13 |
| 4,185,462 | 1/1980 | Morse et al. | 285/13 |
| 4,355,827 | 10/1982 | Ehret | 285/14 X |
| 4,489,960 | 12/1984 | Senatro | 285/45 |
| 4,620,728 | 11/1986 | Barth et al. | 285/14 |
| 4,708,371 | 11/1987 | Elsworth et al. | 285/13 |
| 4,817,994 | 4/1989 | Bronnert | 285/14 X |
| 4,854,611 | 8/1989 | Press | 285/14 X |

FOREIGN PATENT DOCUMENTS

| | | | |
|---|---|---|---|
| 0939967 | 3/1956 | Fed. Rep. of Germany | 285/351 |
| 2239314 | 2/1974 | Fed. Rep. of Germany | 285/351 |
| 0854189 | 11/1960 | United Kingdom | 285/351 |

Primary Examiner—Dave W. Arola
Assistant Examiner—Heather Chun
Attorney, Agent, or Firm—Jerome C. Squillaro

[57] ABSTRACT

A flammable fluid-carring tube coupling assembly for use in a gas turbine engine includes a pair of fitting members each having an inner hub portion and an outer flange portion, a seal and drain arrangement defined within an annular interface region between the fitting members, and an arrangement for releasably clamping the fitting members to one another. The inner hub portions are attachable to ends of fluid-carrying hollow tubes and disposed relative to one another so as to define a flow passage for fluid communication between the hollow tubes. The outer flange portions are attached to and extend radially outwardly from the inner hub portions and are disposed relative to one another so as to define the annular interface region between the fitting members which provides a path of potential fluid leakage from the flow passage to the exterior of the fitting members. The seal and drain arrangement includes an inner annular primary seal encircling the flow passage so as to obstruct the path of potential fluid leakage therefrom to the exterior of the fitting members, a drain channel encircling the inner annular primary seal so as to intersect the path of potential fluid leakage therefrom to the exterior of the fitting members in the event the primary seal should fail, and an outer annular secondary seal encircling the drain channel so as to obstruct the path of potential fluid leakage therefrom to the exterior of the fitting members in the event both the primary seal and the drain channel should fail.

16 Claims, 5 Drawing Sheets

FLUID-CARRYING TUBE COUPLING ASSEMBLY WITH INTERNAL SEAL AND DRAIN ARRANGEMENT

STATEMENT OF GOVERNMENT INTEREST

The Government has rights in this invention pursuant to Subcontract No. 4AF9X2010B under Prime Contract No. NOOO 19-89-C-C awarded by the Department of the Navy.

CROSS-REFERENCE TO RELATED APPLICATION

Reference is hereby made to the following copending U.S. patent application dealing with related subject matter and assigned to the assignee of the present invention: "Tube Coupling" by Jeffrey Glover, assigned U.S. Ser. No. 473,217 and filed Jan. 31, 1990.

BACKGROUND OF THE INVENTION

1. Field of the Invention

The present invention relates generally to gas turbine engines and, more particularly, to a fluid-carrying tube coupling assembly with an internal seal and drain arrangement for use on such engines.

2. Description of the Prior Art

Gas turbine engines typically include a core engine covered by a cowl. The core engine has a compressor for compressing air entering the core engine, a combustor where fuel is mixed with the compressed air and then burned to create a high energy gas stream, and a first or high pressure turbine which extracts energy from the gas stream to drive the compressor.

The area of the core engine covered by the cowl is known as a "fire zone". Pipes or tubes carrying flammable fluids within this fire zone must be made to comply with fire prevention regulations. For example, a fuel-carrying tube within the fire zone must be able to withstand 2000° F. for five minutes, whereas an oil-carrying tube must be able to withstand 2000° F. for fifteen minutes. Furthermore, components are designed to ensure against any single failure causing ignition of a fire so that in most instances a dual failure is necessary before a fire ignition will occur.

Fire prevention in the fire zone is dependent upon providing a component design which will not allow leakage of flammable fluids to come in contact with an ignition source, such as a spark or surface which is above the auto-ignition temperature for that fluid. One potential source of leakage of flammable fluid is from a fitting or coupling between fluid-carrying tubes in the fire zone. Fluid leakage is typically due to maintenance errors, damage to seal surfaces, overpressure and/or loosening caused by an unfavorable environment. Improved coupling designs to reduce, if not eliminate entirely, the potential for flammable fluid leakage to cause a fire are sought after on a continuing basis.

SUMMARY OF THE INVENTION

The present invention provides a fluid-carrying tube coupling assembly designed to satisfy the aforementioned needs. The tube coupling assembly of the present invention incorporates a seal and drain arrangement which is designed, first, to prevent fluid leakage from occurring at all and, second, in the event leakage does occur, to constrain the leaking fluid to exit the coupling assembly in a direction selected to minimize the risk of leaking fluid contacting autoignition temperatures. The selected direction of the leaking fluid flow can be oriented away from an ignition source. While the fluid-carrying tube coupling assembly of the present invention is applicable to any equipment having tubes carrying flammable or hazardous fluids, it is particularly suited to flight vehicles where fire prevention is a prime consideration.

Accordingly, the present invention is directed to a fluid-carrying tube coupling assembly for use in a gas turbine engine. The tube coupling assembly comprises a pair of fitting members each including an inner hub portion and an outer flange portion, a seal and drain arrangement between the outer flange portions of the fitting members, and means for releasably clamping the fitting members to one another at the outer flange portions thereof.

The inner hub portions of the fitting members are attachable to ends of at least a pair of respective fluid-carrying hollow tubes. Also, the inner hub portions are disposed relative to one another so as to define at least one flow passage providing fluid communication between the hollow tubes.

The outer flange portions of the fitting members are attached to and extend radially outwardly from the respective inner hub portions. Also, the outer flange portions are disposed relative to one another so as to define an annular interface region between the fitting members which provides a path of potential fluid leakage from the flow passage to the exterior of the fitting members.

The seal and drain arrangement is defined at the interface region between the outer flange portions of the fitting members. The seal and drain arrangement includes an inner annular primary seal within the annular interface between the fitting members. The primary seal encircles the flow passage of the inner hub portions so as to obstruct the path of potential fluid leakage from the flow passage to the exterior of the fitting members.

Also, the seal and drain arrangement includes a drain channel within the annular interface region between the fitting members. The drain channel encircles the inner annular primary seal so as to intersect the path of potential fluid leakage from the flow passage to the exterior of the fitting members in the event of failure of the primary seal.

Further, the seal and drain arrangement includes an outer annular secondary seal within the annular interface region between the fitting members. The outer annular secondary seal encircles the drain channel so as to obstruct the path of potential fluid leakage from the flow passage to the exterior of the fitting members in the event of failure of both the primary seal and the drain channel.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring to the drawings and all FIGURES therein, there is illustrated four embodiments of a fluid-carrying tube coupling assembly of the present invention, being generally designated 10. While the tube coupling assembly 10 is particularly suited for use in a gas turbine engine (not shown), it is also applicable for use with other equipment having tubes which carry flammable or hazardous fluids. Basically, the tube coupling assembly 10 of each different embodiment includes a pair of fitting members 12, 14, each having at least one inner hub portion 12A, 14A and an outer flange portion 12B, 14B. Also, each embodiment of the tube coupling assembly 10 includes a seal and drain arrangement 16 located between the outer flange portions 12B, 14B of the fitting members 12, 14, and means 18 for releasably clamping the fitting members 12, 14 to one another at the outer flange portions 12B, 14B. The clamping means 18 preferably is in the form of spaced pairs of alignable apertures 20 defined through the outer flange portions 12B, 14B of the fitting members 12, 14 and a plurality of fasteners 22 which are removably installed through the pairs of aligned apertures 20 and tightened to clamp the fitting members 12, 14 together.

The inner hub portions 12A, 14A of the fitting members 12, 14 are attachable, such as by conventional welding or any other suitable technique, to ends 24A of respective fluid-carrying hollow tubes 24. The inner hub portions 12A, 14A define openings through the fitting members 12, 14A define openings through the fitting members 12, 14 that are aligned together to form one or more flow passages 26 which provide communication of the fluid between the ends 24A of the hollow tubes 24.

The outer flange portions 12B, 14B of the fitting members 12, 14 are attached to the respective inner hub portions 12A, 14A and extend radially outwardly therefrom. The outer flange portions 12B, 14B are disposed relative to one another so as to define an annular interface region 28 between the fitting members 12, 14. This interface region 28 inherently provides a path of potential fluid leakage from the flow passage 26 to the exterior of the fitting members 12, 14.

The four embodiments of the tube coupling assembly 10 have different seal and drain arrangement 16 which are designed, first, to prevent fluid leakage from occurring at all and, second, in the event leakage does occur, to constrain the leaking fluid to exit the tube coupling assembly 10 in a manner selected to minimize the risk of the leaking fluid creating a hazard.

The different seal and drain arrangements 16 of the four embodiments of the tube coupling assembly 10 have the same basic components arranged in a common relationship to each other. These basic components are provided at the interface region 28 between the fitting members 12, 14 and particularly between the outer flange portions 12B, 14B thereof. These basic components include an inner annular primary seal 30 encircling the flow passage 26 so as to obstruct the path of potential fluid leakage therefrom to the exterior of the fitting members 12, 14, a drain channel 32 encircling the inner annular primary seal 30 so as to intersect the path of potential fluid leakage therefrom to the exterior of the fitting members 12, 14 in the event the primary seal 30 should fail for any reason, and an outer annular secondary seal 34 encircling the drain channel 32 so as to obstruct the path of potential fluid leakage therefrom to the exterior of the fitting members 12, 14 in the event both the primary seal 30 and the drain channel 32 should fail for any reason. The inner annular primary seal 30, the outer annular secondary seal 34, and the middle drain channel 32 are all spaced from one another.

Each of the inner and outer annular primary and secondary seals 30, 34 is defined by an annular groove 36, 38 and an annular o-ring 40, 42 disposed in the groove 36, 38. The drain channel 32 is defined by a continuous main annular portion 32A and a linear terminal portion 32B. The main annular portion 32A of the drain channel 32 is capable of receiving and collecting fluid leakage 360° around the inner primary seal 30. The linear terminal portion 32B of the drain channel 32 is connected in flow communication with the main fluid collection portion 32A and leads to the exterior of the tube coupling assembly 10. The terminal portion 32B of the drain channel 32 is capable of receiving fluid collected in the main annular portion 32A and routing the fluid to and discharging it at the exterior of the tube coupling assembly 10.

Figure 1:
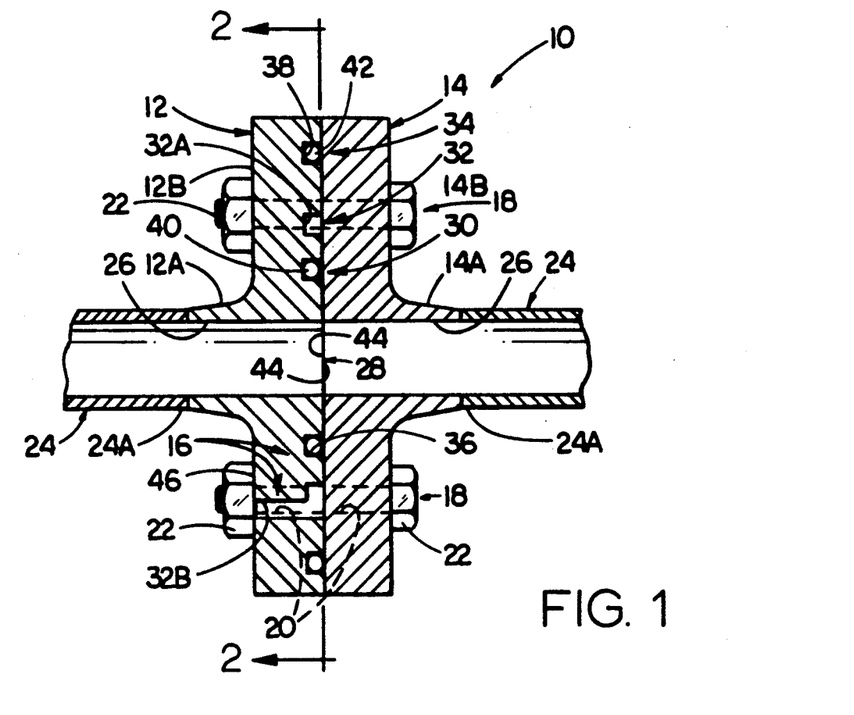
FIG. 1 is a longitudinal axial sectional view of a first embodiment of a fluid-carrying tube coupling assembly of the present invention.
Figure 2:
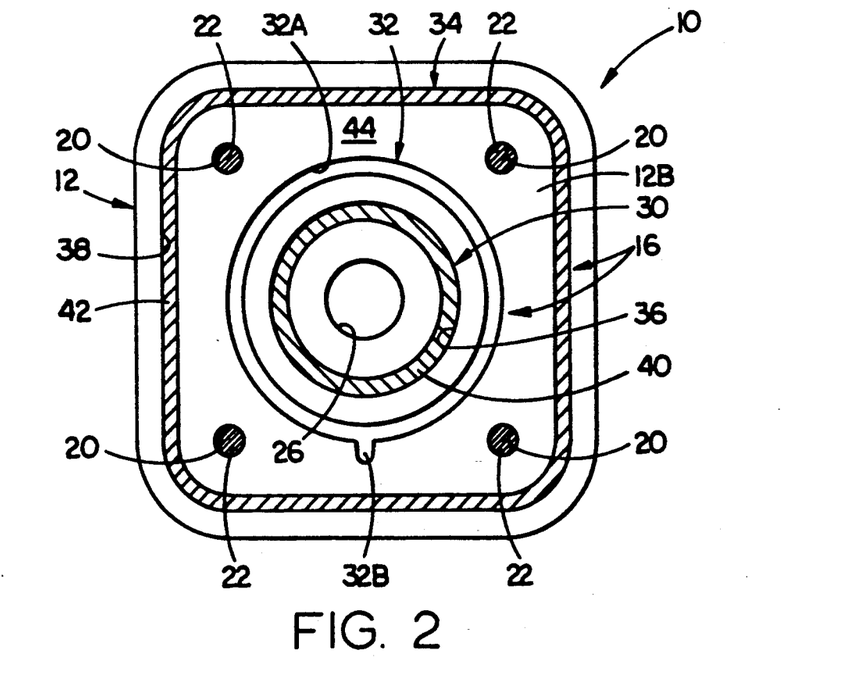
FIG. 2 is a transverse sectional view of the tube coupling assembly as seen along line 2—2 of FIG. 1.

Referring to the first embodiment of the tube coupling assembly 10 in FIGS. 1 and 2, the inner annular primary seal 30, outer annular secondary seal 34, and intermediate drain channel 32 are formed in an axially facing surface 44 of the one fitting member 12. The terminal portion 32B of the drain channel 32 extends generally perpendicular to the plane of the main annular portion 32A thereof to the external surface 46 of the one fitting member 12. The outer annular secondary seal 34 has a rectangular configuration, whereas the inner annular primary seal 30 has a circular configuration. The aligned apertures 20 are defined through the outer flange portions 12B, 14B between the locations of the inner annular primary seal 30 and outer annular secondary seal 34.

Figure 3:
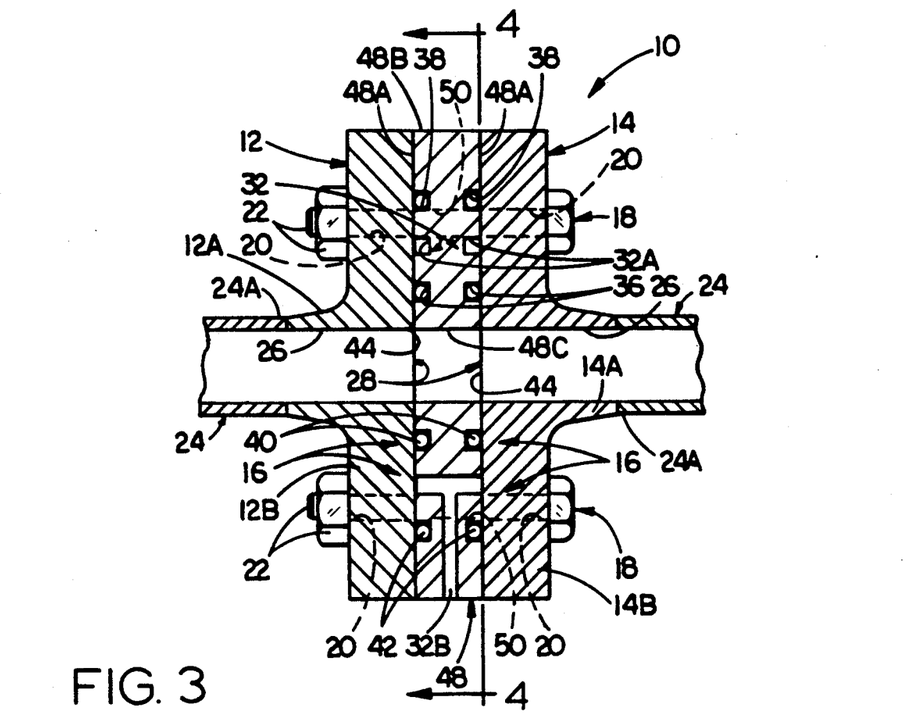
FIG. 3 is a longitudinal axial sectional view of a second embodiment of the tube coupling assembly of the present invention.
Figure 4:
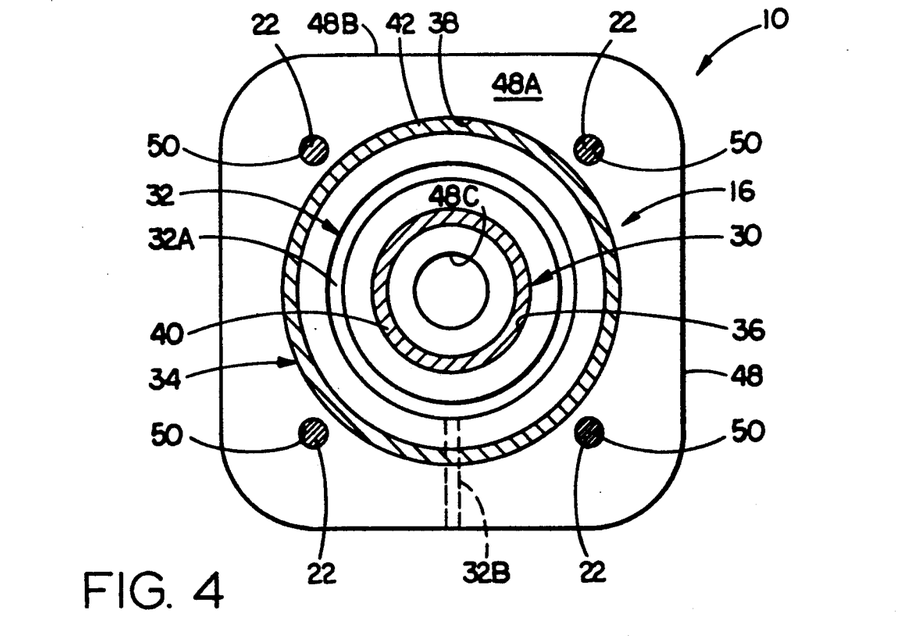
FIG. 4 is a transverse sectional view of the tube coupling assembly as seen along line 4—4 of FIG. 3.

Referring to the second embodiment of the tube coupling assembly 10 in FIGS. 3 and 4, the seal and drain arrangement 16 includes an intermediate annular member 48 disposed in the annular interface region 28 between the fitting members 12, 14 and having opposite side surfaces 48A extending generally parallel with one another and engaged with facing surfaces 44 of the fitting members 12, 14. The inner annular primary seal 30, outer annular secondary seal 34, and intermediate drain channel 32 are concentrically formed in each of the opposite side surfaces 48A of the intermediate annular member 48. Also, the primary seal 30, secondary seal 34 and drain channel 32 on one side surface 48A are disposed generally parallel to the primary seal 30, secondary seal 34 and drain channel 32 on the other opposite side surface 48A of the intermediate annular member 48. The terminal portion 32B of the drain channel 32 has a T-configuration, with an inner part of the terminal portion 32B extending between and interconnecting the main annular portions 32A of the pair of drain channels 32 and an outer part of the terminal portion 32B extending radially outwardly from and transverse to the inner part to an external circumferential surface 48B of the intermediate annular member 48. The aligned apertures 20 defined through the outer flange portions 12B, 14B are also aligned with apertures 50 defined through the intermediate annular member 48. Also, a flow passage 48C through the intermediate annular member 48 is aligned with the flow passage 26 through the fitting members 12, 14.

Figure 5:
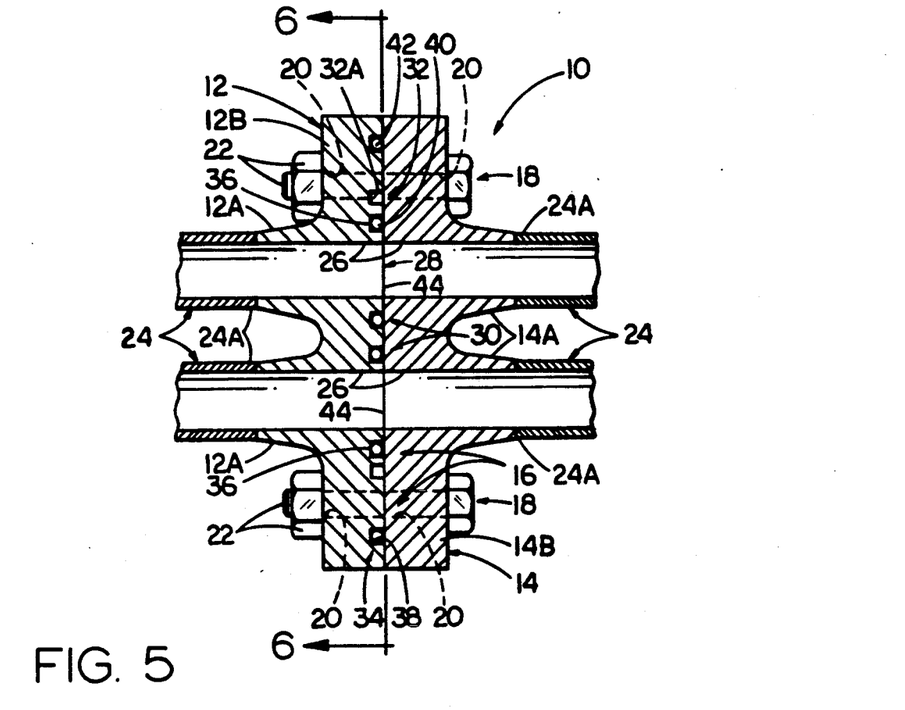
FIG. 5 is a longitudinal axial sectional view of a third embodiment of the tube coupling assembly of the present invention.
Figure 6:
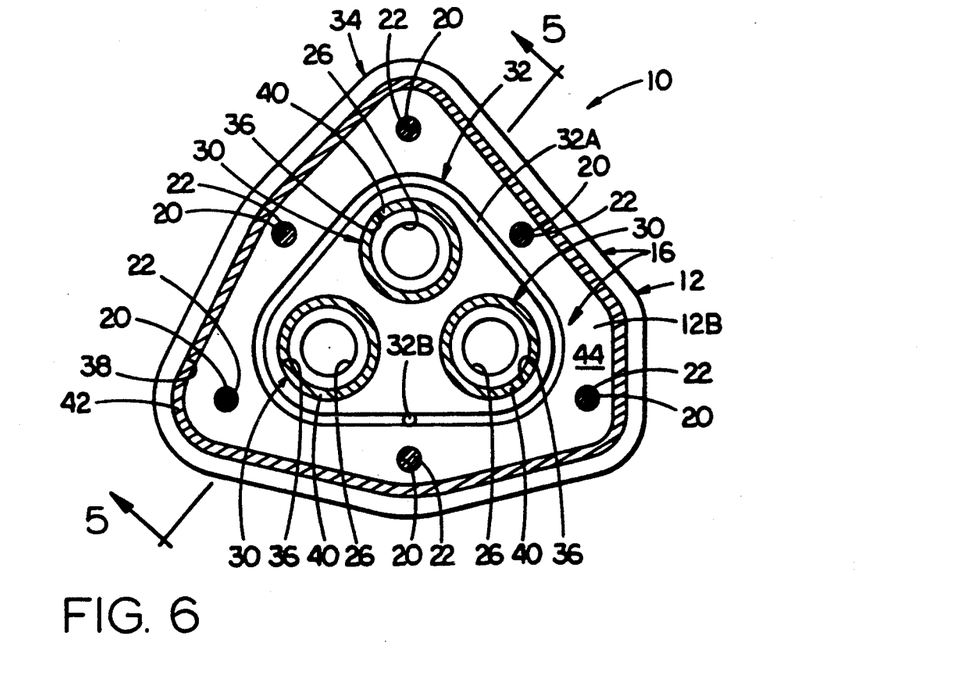
FIG. 6 is a transverse sectional view of the tube coupling assembly as seen along line 6—6 of FIG.

Referring to the third embodiment of the tube coupling assembly 10 in FIGS. 5 and 6, each of the fitting members 12, 14 includes a plurality of the inner hub portions 12A, 14A and a plurality of inner primary seals 30. Each of the inner primary seals 30 encircles one of the inner hub portions 12A, 14A, whereas the drain channel 32 encircles all of the inner primary seals 30.

Figure 7:
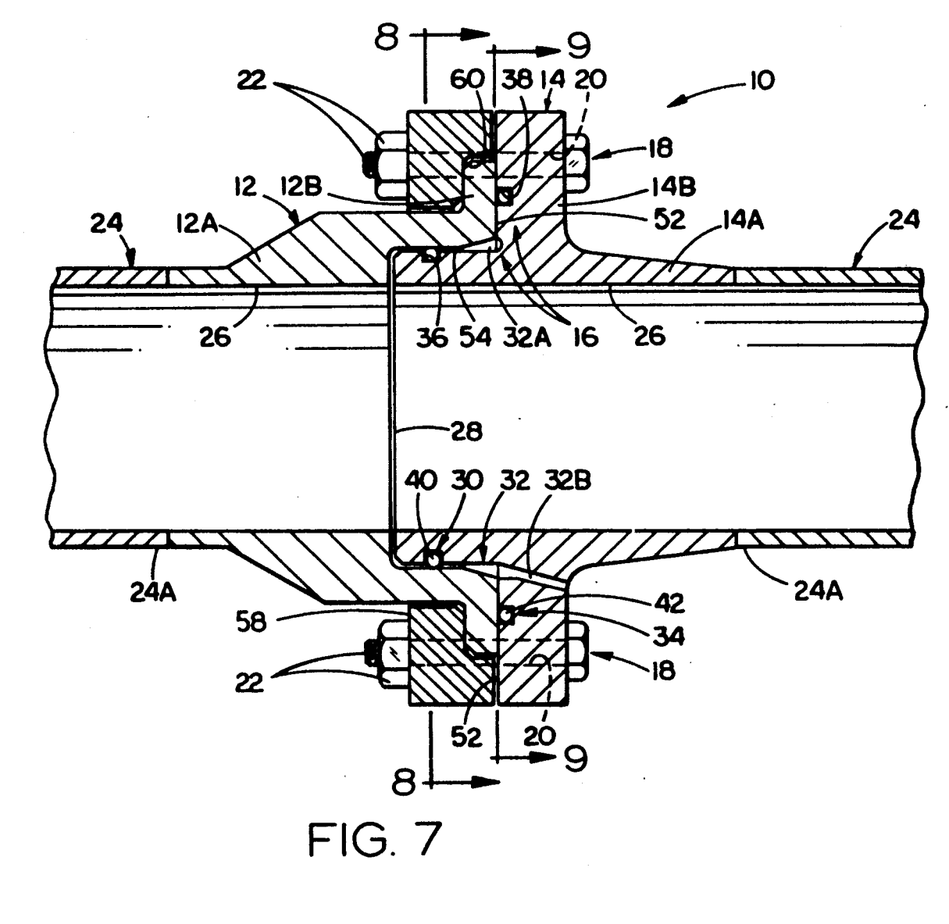
FIG. 7 is a longitudinal axial sectional view of a fourth embodiment of the tube coupling assembly of the present invention.
Figure 8:
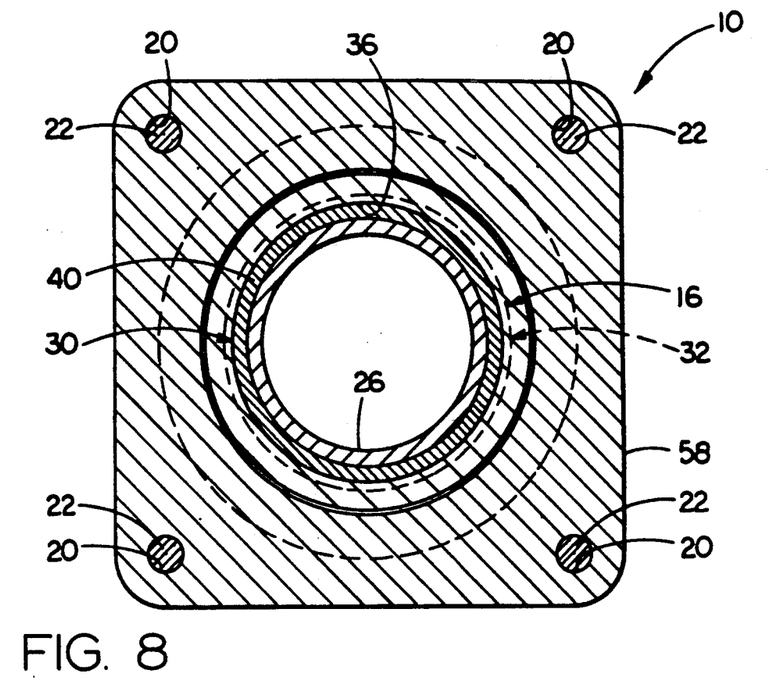
FIG. 8 is a transverse sectional view of the tub coupling assembly as seen along line 8—8 of FIG. 7.
Figure 9:
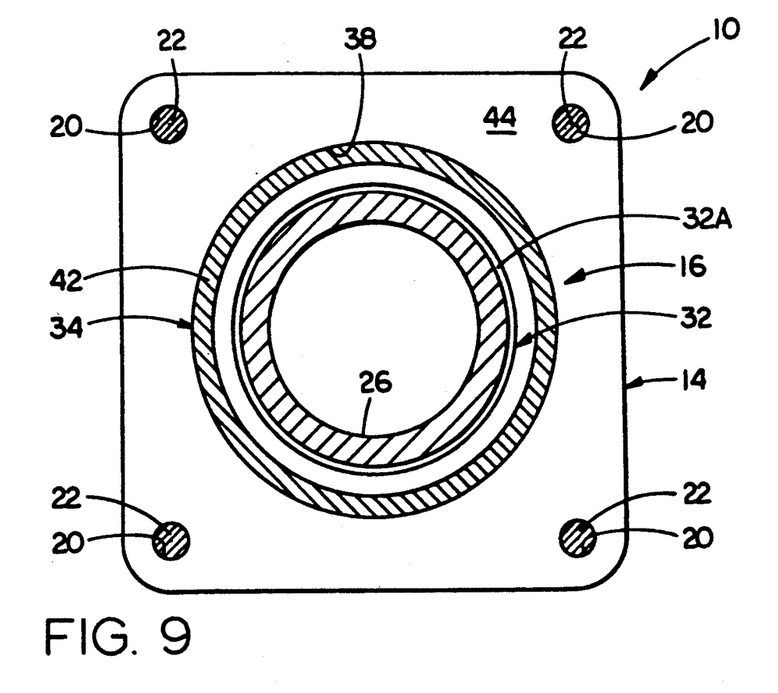
FIG. 9 is another transverse sectional view of the tube coupling assembly as seen along line 9—9 of FIG. 7.

Referring to the fourth embodiment of the tube coupling assembly 10 in FIGS. 7, 8 and 9, the outer flange portions 12B, 14B and the inner hub portions 12A, 14A of the fitting members 12, 14 have respective annular radial surfaces 52 and annular axial surfaces 54 which extend in transverse relation to one another along the interface region 28 between the fitting members 12, 14. The inner annular primary seal 30 is disposed in the axial surface 54 of the inner hub portion 12A, 14A of one of the fitting members 12, 14. The outer annular secondary seal 34 is disposed in the radial surface 52 of the outer flange portion 12B, 14B of one of the fitting members 12, 14. The drain channel 32 is defined at an annular corner 56 formed by the annular axial and radial surfaces 54, 52 of at least one of the fitting members 12, 14. In this seal and drain arrangement 16 all common single failure modes are addressed. A failure of the inner radial or primary seal 30 due to overpressure or damage in assembling the components is protected by the drain channel 32 and outer face or secondary seal 34. In the second mode of failure an under-torqued or missing flange fastener 22 renders the face or secondary seal 34 ineffective but the inner radial or primary seal 30 still functions to seal the fluid. The clamping means 18 includes a swivel flange 58 secured to the outer flange portion 14B of the fitting member 14 by the fasteners 22 and having an interior recess 60 receiving the outer flange portion 12B of the fitting member 12.

In summary, in the event of a failure of the inner primary seal 30, leaking fluid will spread across the facing surfaces 44 of the fitting members 12, 14 until it encounters the drain channel 32. The fluid then seeks the path of least resistance and flows around the continuous annular portion 32A of the drain channel 32 exiting through the terminal portion 32B thereof to the exterior of the coupling assembly 10. The outer annular secondary seal 34 is designed to discourage any fluid from bypassing the drain channel 32. The exit or terminal portion 32B of the drain channel 32 may be located in any preferred orientation to minimize risk of leaking fluid creating a hazardous condition.

In conclusion, some of the advantages of the improved fluid-carrying tube coupling assembly 10 of the present invention are that it: (1) makes provision for fire prevention in the event of a primary seal failure; (2) eliminates the need for separate drain collection systems for primary seal failure; (3) permits a tube of a drain system to be attached to the coupling assembly in areas where leakage of fluid cannot be tolerated; and (4) provides a single location for leak inspection which can be oriented to maximize visibility for maintenance personnel.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A fluid-carrying tube coupling assembly for use in a gas turbine engine, said tube coupling comprises:
   (a) a pair of fitting members each including an inner hub portion and an outer flange portion, said inner hub portions being attachable to ends of at least a pair of respective fluid-carrying hollow tubes and being disposed relative to one another so as to define at least one flow passage for providing fluid communication between the hollow tubes, said outer flange portions being attached to and extending radially outwardly from said respective inner hub portions and disposed relative to one another so as to define an annular interface region between said fitting members which provides a path of potential fluid leakage from said flow passage to the exterior of said fitting members;
   (b) a seal and drain arrangement located at said interface region between said outer flange portions of said fitting members, said seal and drain arrangement including an inner annular primary seal encircling said flow passage so as to obstruct the path of potential fluid leakage from said flow passage to the exterior of said fitting members and a drain channel encircling said inner annular primary seal so as to intersect the path of potential fluid leakage from said flow passage to the exterior of said fitting members in the event said primary seal should fail; and
   (c) means for releasably clamping said fitting members to one another at said outer flange portions thereof; and
   (d) wherein said seal and drain arrangement also includes an outer annular secondary seal encircling said drain channel so as to obstruct the path of potential fluid leakage from said flow passage to the exterior of said fitting members in the event both said primary seal and said drain channel should fail;
   (e) wherein said clamping means includes:
      (i) a plurality of aligned apertures defined through said outer flange portions of said fitting members between locations of said inner annular primary seal and outer annular secondary seal; and (ii) a plurality of fasteners being removably installed through said aligned apertures and tightened to clamp said fitting members together; and (f) wherein said inner annular primary seal includes an annular groove formed in an axially facing surface of one of said fitting members and an annular o-ring disposed in said groove.

2. The assembly as recited in claim 1 wherein said drain channel includes a continuous main annular portion and a terminal portion extending outwardly therefrom and connected in flow communication with said main annular portion.

3. The assembly as recited in claim 2, wherein said main annular portion of said drain channel encircles said inner primary seal is capable of receiving and collecting fluid leakage from around said inner primary seal.

4. The assembly as recited in claim 3 wherein said terminal portion of said drain channel leads from said main annular portion thereof to the exterior of said fitting members such that said terminal portion is capable of receiving fluid collected in said main annular portion and of routing the fluid to and discharging it at the exterior of said fitting members.

5. The assembly as recited in claim 4, wherein said outer annular secondary seal includes a secondary seal annular groove and a second annular o-ring disposed in said secondary seal annular groove.

6. The assembly as recited in claim 1, wherein said inner annular primary seal, said outer annular secondary seal, and said middle drain channel are all spaced apart from one another.

7. A fluid-carrying tube coupling assembly for use in a gas turbine engine, said tube coupling comprises;

(a) a pair of fitting members each including an inner hub portion and an outer flange portion, said inner hub portions being attachable to ends of at least a pair of respective fluid-carrying hollow tubes and being disposed relative to one another so as to define at least one flow passage for providing fluid communication between the hollow tubes, said outer flange portions being attached to and extending radially outwardly from said respective inner hub portions and disposed relative to one another so as to define an annular interface region between said fitting members which provides a path of potential fluid leakage from said flow passage to the exterior of said fitting members;

(b) a seal and drain arrangement located at said interface region between said outer flange portions of said fitting members, said seal and drain arrangement including an inner annular primary seal encircling said flow passage so as to obstruct the path of potential fluid leakage from said flow passage to the exterior of said fitting members and a drain channel encircling said inner annular primary seal so as to intersect the path of potential fluid leakage from said flow passage to the exterior of said fitting members in the event said primary seal should fail; and (c) means for releasably clamping said fitting members to one another at said outer flange portions thereof; and (d) wherein said seal and drain arrangement includes:

(i) an intermediate annular member disposed in said annular interface region between said fitting members and having opposite sides engaging said fitting members; and (ii) a pair of said inner annular primary seal and said drain channel disposed on each of said opposite sides of said intermediate annular member.

8. The assembly as recited in claim 7, wherein said seal and drain arrangement also includes an outer annular secondary seal disposed on each of said opposite sides of said intermediate annular member and encircling said drain channel thereon so as to obstruct the path of potential fluid leakage from said flow passage to the exterior of said fitting members in the event both said primary seal and said drain channel should fail.

9. The assembly as recited in claim 8, wherein each of said outer annular secondary seals includes an annular groove formed in one of said opposite sides of said intermediate annular member and an annular 0-ring disposed in said groove.

10. The assembly as recited in claim 7, wherein each of said drain channels includes a continuous main annular portion and a terminal portion formed in one of said opposite sides of said intermediate annular member, said terminal portion extending outwardly from and connected in flow communication with said main annular portion.

11. The assembly as recited in claim 10, wherein said main annular portion of each of said drain channels is capable of receiving and collecting fluid leakage from around said inner primary seal.

12. The assembly as recited in claim 11, wherein said terminal portion of each of said drain channels leads from said main annular portion of said drain channel to the exterior of said fitting members such that said terminal portion is capable of receiving fluid collected in said main annular portion and routing the fluid to and discharging it at the exterior of said fitting members.

13. The assembly as recited in claim 7, wherein each of said inner annular primary seals includes an annular groove formed in one of said opposite sides of said intermediate annular member and an annular O-ring disposed in said groove.

14. The assembly as recited in claim 7, wherein said clamping means includes;

a plurality of aligned apertures defined through said intermediate annular member and said outer flange portions of said fitting members; and a plurality of fasteners being removably installed through said aligned apertures and tightened to clamp said fitting members and said intermediate annular member together.

15. A fluid-carrying tube coupling assembly for use in a gas turbine engine, said tube coupling comprises:

(a) a pair of fitting members each including an inner hub portion and an outer flange portion, said inner hub portions being attachable to ends of at least a pair of respective fluid-carrying hollow tubes and being disposed relative to one another so as to define at least one flow passage for providing fluid communication between the hollow tubes, said outer flange portions being attached to and extending radially outwardly from said respective inner hub portions and disposed relative to one another so as to define an annular interface region between said fitting members which provides a path of potential fluid leakage from said flow passage to the exterior of said fitting members;

(b) a seal and drain arrangement located at said interface region between said outer flange portions of said fitting members, said seal and drain arrangement including an inner annular primary seal encircling said flow passage so as to obstruct the path of potential fluid leakage from said flow passage to the exterior of said fitting members and a drain channel encircling said inner annular primary seal so as to intersect the path of potential fluid leakage from said flow passage to the exterior of said fitting members in the event said primary seal should fail; and (c) means for releasably clamping said fitting members to one another at said outer flange portions thereof; and (d) wherein each of said fitting members includes a plurality of said inner hub portions and a plurality of inner primary seals, each of said inner primary seals encircling one of said inner hub portions, said drain channel encircling all of said plurality of inner primary seals.

16. A fluid-carrying tube coupling assembly for use in a gas turbine engine, said tube coupling comprises;

(a) a pair of fitting members each including an inner hub portion and an outer flange portion, said inner hub portions being attachable to ends of at least a pair of respective fluid-carrying hollow tubes and being disposed relative to one another so as to define at least one flow passage for providing fluid communication between the hollow tubes, said outer flange portions being attached to and extending radially outwardly from said respective inner hub portions and disposed relative to one another so as to define an annular interface region between said fitting members which provides a path of potential fluid leakage from said flow passage to the exterior of said fitting members;

(b) a seal and drain arrangement located at said interface region between said outer flange portions of said fitting members, said seal and drain arrangement including an inner annular primary seal encircling said flow passage so as to obstruct the path of potential fluid leakage from said flow passage to the exterior of said fitting members and a drain channel encircling said inner annular primary seal so as to intersect the path of potential fluid leakage from said flow passage to the exterior of said fitting members in the event said primary seal should fail; and (c) means for releasably clamping said fitting members to one another at said outer flange portions thereof; and (d) wherein said seal and drain arrangement also includes an outer annular secondary seal encircling said drain channel so as to obstruct the path of potential fluid leakage from said flow passage to the exterior of said fitting members in the event both said primary seal and said drain channel should fail;

(e) wherein said outer flange portions and said inner hub portions of said fitting members have respective annular radial surfaces and annular axial surfaces extending in transverse relation to one another along said interface region between said fitting members;

(f) wherein said inner annular primary seal is disposed in said axial surface of said inner hub portion of one of said fitting members and includes a primary seal annular groove formed in said axial surface and a first annular o-ring disposed in said primary seal annular groove;

(g) wherein said outer annular secondary seal is disposed in said radial surface of said outer flange portion of one of said fitting members and includes a secondary seal annular groove formed in said radial surface and a second annular o-ring disposed in said secondary seal annular groove; and (h) wherein said drain channel is defined at an annular corner formed by said axial and radial surfaces of at least one of said fitting members.

* * * * *